(12) United States Patent
Yukawa

(10) Patent No.: US 8,283,405 B2
(45) Date of Patent: *Oct. 9, 2012

(54) WATER-BASED PAINT COMPOSITIONS

(75) Inventor: Yoshiyuki Yukawa, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 201 days.

This patent is subject to a terminal disclaimer.

(21) Appl. No.: 12/285,605

(22) Filed: Oct. 9, 2008

(65) Prior Publication Data

US 2009/0099298 A1    Apr. 16, 2009

(30) Foreign Application Priority Data

Oct. 11, 2007  (JP) ................................. 2007-265620

(51) Int. Cl.
  *C08L 33/02*  (2006.01)
  *C08L 67/06*  (2006.01)
  *C08L 67/00*  (2006.01)

(52) U.S. Cl. ......... 524/502; 524/501; 524/513; 524/539

(58) Field of Classification Search .................. 524/501, 524/502, 513, 539

See application file for complete search history.

(56) References Cited

U.S. PATENT DOCUMENTS

| | | | | |
|---|---|---|---|---|
| 4,981,885 A | * | 1/1991 | Engel et al. ................... | 523/409 |
| 5,489,645 A | * | 2/1996 | Tahara et al. ................. | 524/817 |
| 7,022,759 B2 | * | 4/2006 | Martin et al. ................. | 524/513 |
| 7,087,672 B2 | * | 8/2006 | Yuan et al. .................... | 524/507 |
| 2005/0255330 A1 | * | 11/2005 | Meyer ........................... | 428/480 |

FOREIGN PATENT DOCUMENTS

| | | |
|---|---|---|
| JP | 2004-137504 | 5/2004 |
| JP | 2005-281589 | 10/2005 |
| JP | 2006-159079 | 6/2006 |
| WO | 2008/018442 | 2/2008 |
| WO | 2008/123387 | 10/2008 |

* cited by examiner

*Primary Examiner* — Satya Sastri

(74) *Attorney, Agent, or Firm* — Wenderoth, Lind & Ponack, L.L.P.

(57) ABSTRACT

This invention provides water-based paint compositions which can form coating film excelling in finished appearance such as coated surface smoothness and also of excellent performance in such properties as water resistance, which comprise water-dispersible acrylic polymer particles (A), reactive group-containing resin (B) and optionally curing agent (C), the water-dispersible acrylic polymer particles (A) having a weight-average molecular weight of at least 1,100,000 and an absorbance not higher than 0.2 at the wavelength of 330 nm as measured with spectrophotometer in the state of a liquid dispersion at a mass concentration of 1.35% in 1,4-dioxane solvent.

14 Claims, No Drawings

WATER-BASED PAINT COMPOSITIONS

TECHNICAL FIELD

This invention relates to water-based paint compositions capable of forming coating films which exhibit high performance such as water resistance and finishing property such as coated surface smoothness.

BACKGROUND ART

Recently, environmental problems on global scale are gathering keen attention. In also coating industry, attempts for environmental improvement are positively advanced. In particular, most of volatile organic solvent (VOC) is discharged during coating steps and effective countermeasure is of urgent necessity. With the view to reduce VOC discharge, conversion of paint in general to water-based type is being advanced.

However, conventional water-based paint generally is inferior in coating film performance such as mechanical properties and water resistance, as compared with solvent-based paint.

While it is generally effective for improving coating film performance to use high molecular weight resins (in particular, acrylic resin), there is a problem that use of, for example, intraparticulate crosslinking type high molecular weight acrylic resin emulsion degrades finished appearance such as coated surface smoothness, and coating workability.

On the other hand, JP 2004-137504A discloses aqueous acrylamide polymer solution having a specific concentration and weight-average molecular weight of 500,000-10,000,000 at a specific viscosity range, as an aqueous high molecular weight polymer solution. The main use of the polymer, however, is for paper reinforcing agent. It is unsuitable for use in paint, because it shows unsatisfactory finishing property and coating workability as a high molecular weight acrylic resin for paint use, and coating film formed thereof has insufficient water resistance.

DISCLOSURE OF THE INVENTION

The object of the present invention is to provide water-based paint compositions which can form coating film excelling in finished appearance such as coated surface smoothness and also of excellent performance in such properties as water resistance.

We fixed our eyes on the influence of high molecular weight resin contained in paint, particularly on coating film performance and finished appearance such as coated surface smoothness, and made concentrative studies to now discover that water-dispersible acrylic polymer particles having specific absorbance characteristics, i.e., having an absorbance not higher than a specific value as measured with a spectrophotometer in a state of a liquid dispersion at a specific low concentration in dioxane solvent, and also having a weight average molecular weight of at least 1,100,000, are effective for achieving the above object, as the high molecular weight resin for water-based paint. Whereupon the present invention came to be completed.

Thus the invention provides a water-based paint composition characterized by comprising water-dispersible acrylic polymer particles (A), reactive group-containing resin (B) and optionally curing agent (C), the water-dispersible acrylic polymer particles (A) having a weight-average molecular weight of at least 1,100,000 and an absorbance not higher than 0.2 at the wavelength of 330 nm as measured with spectrophotometer in the state of a liquid dispersion at a mass concentration of 1.35% in 1,4-dioxane solvent.

The water-dispersible acrylic polymer particles which are used in the water-based paint compositions of the invention have a unique property that their liquid dispersion in 1,4-dioxane solvent has extremely high transparency, although the polymer has such a high molecular weight as at least 1,100,000.

For water-based paint containing high molecular weight polymer particles, usually crosslinked polymer particles are used in most cases, and which polymer particles, when dispersed in 1,4-dioxane solvent, show low transparency. In the coating film formed of such water-based paint containing crosslinked polymer particles, however, the polymer particles are apt to be irregularly distributed like islands in a sea-island structure.

By contrast, in the water-based paint composition according to the invention the water-dispersible acrylic polymer particles having the above characteristics are used and, compared with water-based paint containing the polymer particles whose liquid dispersion in 1,4-dioxane solvent shows poor transparency, the high molecular weight polymer particles can be uniformly distributed in continuous phase in the coating film.

In consequence, the water-based paint composition of the present invention exhibits good flow property regardless of the high molecular weight polymer particles contained therein as a constituent component and, therefore, excels in finished appearance such as the coated surface smoothness.

The water-based paint composition of the invention can form coating film excelling also in such performance as water resistance.

Thus, the water-based paint composition of the present invention brings about the conspicuous effect of providing coating film superior in both finished appearance such as coated surface smoothness and performance such as water resistance.

Hereinafter the water-based paint composition of the present invention is explained in further details.

The water-based paint composition of the present invention (which may be hereafter referred to as "the present paint") comprises water-dispersible acrylic polymer particles (A) and reactive group-containing resin (B) as the essential components, and optionally curing agent (C).

Water-dispersible Acrylic Polymer Particles (A)

Water-dispersible acrylic polymer particles (A) in the present paint have a weight-average molecular weight of at least 1,100,000 and an absorbance at the wavelength of 330 nm not higher than 0.2, as measured as to their liquid dispersion in 1,4-dioxane solvent at a mass concentration of 1.35% with a spectrophotometer.

The less the above absorbance value, the higher the transparency of the liquid dispersion of the polymer particles in 1,4-dioxane solvent, indicating very low degree of crosslinkage of the polymer particles. The water-dispersible acrylic polymer particles (A) in the present paint have the characteristic feature of extremely high transparency, as indicated by the absorbance not higher than 0.2, preferably not higher than 0.15, in the state of a liquid dispersion in 1,4-dioxane solvent at a mass concentration of 1.35%.

In this specification, the liquid dispersion in 1,4-dioxane solvent encompasses both the solution and dispersion in which 1,4-dioxane serves as the solvent.

The water-dispersible acrylic polymer particles (A) can be obtained, for example, by emulsion polymerization of polymerizable unsaturated monomers represented by vinyl monomers in the presence of a dispersion stabilizer like surfactant, using radical polymerization initiator.

As emulsion-polymerizable unsaturated monomers, for example, carboxyl-containing polymerizable unsaturated monomer (M-1), hydroxyl-containing polymerizable unsaturated monomer (M-2), other polymerizable unsaturated monomer (M-3) and polyvinyl compound (M-4) which contains at least two polymerizable unsaturated groups per molecule, can be named.

Carboxyl-containing polymerizable unsaturated monomers (M-1) are the compounds having at least one carboxyl group and one polymerizable unsaturated group per molecule, for example, acrylic acid, methacrylic acid, crotonic acid, maleic acid, itaconic acid and the like. Furthermore, acid anhydrides of these compounds and monocarboxylic acids formed by half-esterification of the acid anhydrides are included in the monomer (M-1) in the present specification.

Such carboxyl-containing polymerizable unsaturated monomers are for introducing carboxyl groups into the water-dispersible acrylic polymer particles (A), and as the carboxyl-containing polymerizable unsaturated monomers, generally acrylic acid or methacrylic acid are frequently used. From the viewpoint of coating film performance such as water resistance, methacrylic acid is particularly preferred.

When acrylic acid is used, carboxyl groups in the formed polymer particles tend to be localized on the particle surfaces, because acrylic acid has higher degree of dissociation in water than methacrylic acid. Whereas, when methacrylic acid is used, carboxyl groups can be more easily uniformly distributed inside of the particles, than the case of using acrylic acid. When methacrylic acid is used, for this reason presumably the carboxyl groups which are hydrophilic groups are more easily uniformly distributed inside the particles when the paint is formed into coating film than the case of using acrylic acid, and water resistance (whitening resistance) of the coating film is improved.

These carboxyl-containing polymerizable unsaturated monomers (M-1) can be used either alone or in combination of two or more.

Hydroxyl-containing polymerizable unsaturated monomers (M-2) are the compounds having one each of hydroxyl group and polymerizable unsaturated group per molecule, the hydroxyl group acting as the functional group to react with the crosslinking agent. As the monomers, monoesterified products of acrylic acid or methacrylic acid with $C_{2-10}$ dihydric alcohols are preferred, examples of which include hydroxyl-containing acrylate monomers such as 2-hydroxyethyl acrylate, 2-hydroxypropyl acrylate, 3-hydroxypropyl acrylate, 4-hydroxybutyl acrylate and the like; hydroxyl-containing methacrylate monomers such as 2-hydroxyethyl methacrylate, 2-hydroxypropyl methacrylate, 3-hydroxypropyl methacrylate, 4-hydroxybutyl methacrylate and the like; N-methylolacrylamide, N-methylolmethacrylamide and the like.

Of these, hydroxyl-containing methacrylate monomers are preferred from the viewpoint of water resistance, 2-hydroxyethyl methacrylate being particularly preferred.

These hydroxyl-containing polymerizable unsaturated monomers (M-2) can be used either alone or in combination of two or more.

Other polymerizable unsaturated monomers (M-3) are the compounds other than above monomers (M-1) and (M-2), having one polymerizable unsaturated group per molecule, specific examples of which are enumerated in the following (1)-(8):

(1) monoesterified products of acrylic acid or methacrylic acid with $C_{1-20}$ monohydric alcohols; for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate, stearyl acrylate, stearyl methacrylate and the like, (2) aromatic vinyl monomers: for example, styrene, α-methylstyrene, vinyltoluene and the like, (3) glycidyl-containing vinyl monomers: compounds having at least one glycidyl group and one polymerizable unsaturated bond per molecule, e.g., glycidyl acrylate, glycidyl methacrylate and the like, (4) nitrogen-containing alkyl ($C_{1-20}$) (meth)acrylates: for example, dimethylaminoethyl acrylate, dimethylaminoethyl methacrylate and the like, (5) polymerizable unsaturated group-containing amide compounds: compounds having at least one amido group and one polymerizable unsaturated bond per molecule, e.g., acrylamide, methacrylamide, dimethylacrylamide, N,N-dimethylpropyl-acrylamide, N-butoxymethylacrylamide, diacetonacrylamide and the like, (6) polymerizable unsaturated group-containing nitrile compounds: for example, acrylonitrile, methacrylonitrile and the like, (7) diene compounds: for example, butadiene, isoprene and the like, (8) vinyl compounds: for example, vinyl acetate, vinyl propionate, vinyl chloride and the like.

These other vinyl monomers (M-3) can be used either alone or in combination of two or more.

Polyvinyl compounds (M-4) are the compounds having at least two polymerizable unsaturated groups per molecule, and as examples of which ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylenebis(meth)-acrylamide, ethylenebis(meth)acrylamide and the like can be named. The polyvinyl compounds (M-4) do not include above diene compounds.

These polyvinyl compounds (M-4) can be used either alone or in combination of two or more.

The use ratios of the polymerizable unsaturated monomers in the occasion of producing the water-dispersible acrylic polymer particles (A) are, based on the total amount of the polymerizable unsaturated monomers, the carboxyl-containing polymerizable unsaturated monomer (M-1) is within a range of generally 0.1-25 mass %, preferably 0.1-10 mass %, inter alia, 0.5-5 mass %, from the viewpoint of water-dispersibility and water resistance of the polymer particles; the hydroxyl-containing polymerizable unsaturated monomer (M-2) is, while differing depending on the kind and amount of the curing agent used, within a range of generally 0.1-40 mass %, preferably 0.1-25 mass %, inter alia, 1-10 mass %, from the viewpoints of curability and water resistance of the coating film; and other polymerizable unsaturated monomer (M-3) can be within a range of generally 35-99.8 mass %, preferably 65-99.8 mass %.

Also from the viewpoint of imparting high molecular weight and reducing unreacted residual monomeric component, it is recommendable to use acrylate monomer and styrene in a combined amount within a range of generally 20-80 mass %, in particular, 25-70 mass %, inter alia, 30-60 mass %.

Polyvinyl compound (M-4) can be used where necessary, but from the viewpoint of obtaining water-dispersible acrylic polymer particles showing the absorbance value not higher than 0.2 indicating high transparency, in other words, having extremely low degree of crosslinkage, it is preferable to use it in a very minor amount, even when used. Therefore, the use ratio of the polyvinyl compound (M-4) based on the total amount of the polymerizable unsaturated monomers can be within a range of generally 0-1 mass %, preferably 0-0.3 mass %, inter alia, 0-0.05 mass %.

As the dispersion stabilizer, anionic emulsifier, nonionic emulsifier, amphoteric emulsifier and the like can be used, specific examples including, as anionic emulsifier, fatty acid, alkylsulfuric acid ester salt, alkylbenzenesulfonic acid salt, alkylphosphoric acid salt and the like; and as nonionic emulsifier, polyoxyethylene alkyl ether, polyoxyethylene alkylallyl ether, polyoxyethylene derivatives, sorbitan fatty acid ester, polyoxyethylene sorbitan fatty acid ester, polyoxyethylene alkylamine, alkylalkanolamide and the like. As amphoteric emulsifier, for example, alkylbetaine can be named.

As the dispersion stabilizer, reactive emulsifier can be used with particular advantage, from the viewpoint of copolymerizability of the vinyl monomers constituting the water-dispersible acrylic polymer particles (A) in the emulsion polymerization reaction, dispersion stability of the water-dispersible acrylic polymer particles (A) in the present paint, performance such as water resistance of the coating film formed of the present paint and reduction of residual monomer for environmental protection. Reactive emulsifier refers to emulsifiers which are radical-reactable with the vinyl monomers, which include surfactant having polymerizable unsaturated group(s) per molecule.

Specific examples of reactive emulsifier include ELEMINOL JS-1, ELEMINOL JS-2 (tradename, Sanyo Chemical Industries, Ltd.); S-120, S-180A, S-180, LATEMUL PD-104, LATEMUL PD-420, LATEMUL PD-430S, LATEMUL PD-450 (tradename, KAO Corporation); AQUALON HS-10, AQUALON KH-10 (tradename, Daiichi Kogyo Seiyaku Co., Ltd.); Adekariasoap SE-10N, Adekariasoap SE-20N, Adekariasoap SR-1025, Adekariasoap ER-10, Adekaria Soap ER-20, Adekariasoap ER-30, Adekariasoap ER-40 (tradename, Asahi Denka Kogyo K.K.); ANTOX MS-60 (tradename, Nippon Nyukazai Co., Ltd.) and the like.

Of the above reactive emulsifiers, particularly those having polyoxyethylene group(s) represented by the formula —(CH$_2$CH$_2$O)$_n$— [here n is an integer of 5-60, preferably 10-55, inter alia, 20-45] and polymerizable unsaturated group(s) per molecule are preferred. Specific examples of such reactive emulsifier include Adekariasoap ER-30, Adekariasoap ER-40 and LATEMUL PD-450.

The water-dispersible acrylic polymer particles synthesized with use of such a reactive emulsifier having the above polyoxyethylene groups and polymerizable unsaturated groups take the construction that the polyoxyethylene groups of the reactive emulsifier are grafted to the main chains of the water-dispersible acrylic polymer particles like branches, which act like a dispersion stabilizer for hydrophobic components such as pigment, curing agent and the like in the paint composition in the state of a coating liquid, and also act as an agent to make the particles compatible with other components in the uncured coating film. Hence they are particularly suitable as the water-dispersible acrylic polymer particles (A) to be used in the paint compositions of the present invention.

Dispersion stabilizers such as above-described emulsifiers can be used either alone or in combination of two or more in the emulsion polymerization reaction.

The use ratio of such dispersion stabilizer is preferably within a range of generally 0.1-10 mass %, in particular, 1-7.5 mass %, inter alia, 1.5-6 mass %, based on the formed water-dispersible acrylic polymer particles.

When a reactive emulsifier is used as the dispersion stabilizer, the use ratio of the reactive emulsifier is preferably within a range of generally 0.1-10 mass %, in particular, 1.5-7.5 mass %, inter alia, 2-6 mass %, based on the formed water-dispersible acrylic polymer particles.

As the radical polymerization initiator, for example, peroxides represented by ammonium persulfate, potassium persulfate, ammonium peroxide and the like; so-called redox initiators formed of above peroxides in combination with reducing agents such as sodium hydrogensulfite, sodium thiosulfate, Rongalit, ascorbic acid and the like; and azo compounds such as 2,2'-azobisisobutyronitrile, 4,4'-azobis (4-cyanopentanoic acid), 2,2'-azobis[2-methyl-N-(2-hydroxyethyl)-propionamide] and the like can be named. Of those, azo compounds are preferred.

Of those azo compounds, particularly those which are difficultly water-soluble, having a solubility in 25° C. water not higher than 3 mass %, are preferred. Specific examples of such azo compounds include 2,2'-azobisisobutyronitrile, 2,2'-azobis-2-methylbutyronitrile, 2,2'-azobis-2,4-dimethylvaleronitrile, 1,1'-azobis(1-cyclohexane-1-carbonitrile), 2,2'-azobis[2-methyl-N-(2-hydroxyethyl)-propionamide], 2,2'-azobis[2-(2-imidazolin-2-yl)propane] and dimethyl-2,2'-azobisisobutyrate. From the viewpoint of obtaining high molecular weight, 2,2'-azobisisobutyronitrile, 2,2'-azobis[2-(2-imidazolin-2-yl)propane] and dimethyl-2,2'-azobisisobutyrate are particulary preferred.

Suitable use ratio of the radical polymerization initiator is, based on the total mass of the solid content of polymerizable unsaturated monomers forming the water-dispersible acrylic polymer particles, within a range of normally 0.01-5.0 mass %, preferably 0.01-3.0 mass %, inter alia, 0.01-1.0 mass %.

The adequate combined concentration of radical-polymerizable unsaturated monomers during the emulsion polymerization reaction is normally within a range of 0.1-60 mass %, preferably 0.5-50 mass %, inter alia, 1-50 mass %.

The reaction temperature in the occasion of emulsion polymerization differs depending on the kind of radical polymerization initiator used, while it can be normally within a range of 40-100° C., preferably 50-90° C., inter alia, 60-80° C. Also the reaction time can be normally 3-24 hours, preferably 5-20 hours, inter alia, around 7-16 hours.

The water-dispersible acrylic polymer particles (A) can take either of ordinary homogeneous structure or multilayered structure such as core/shell structure.

Specifically, core/shell structured water-dispersible acrylic polymer particles (A) can be obtained by, for example, first emulsion polymerizing the polymerizable unsaturated monomeric component containing no or little carboxyl-containing polymerizable unsaturated monomer (M-1), thereafter adding the polymerizable unsaturated monomeric component containing a large amount of the carboxyl-containing polymerizable unsaturated monomers (M-1), and continuing the emulsion polymerization. Linkage of the core part and shell part can be effected, for example, by copolymerizing the polymerizable unsaturated bonds derived from polyvinyl compound (M-4) such as allyl acrylate, allyl methacrylate or the like, which are remaining on the surface of the core part, with the polymerizable unsaturated monomeric component containing carboxyl-containing polymerizable unsaturated monomer (M-1).

The water-dispersible acrylic polymer particles (A) can have an acid value within a range of generally 0.1-100 mgKOH/g, preferably 0.5-50 mgKOH/g, inter alia, 1-35 mgKOH/g, from the viewpoint of storage stability or water resistance of resulting coating film.

Furthermore, the water-dispersible acrylic polymer particles (A) can have a hydroxyl value within a range of generally 0-150 mgKOH/g, preferably 5-100 mgKOH/g, inter alia, 10-50 mgKOH/g, from the viewpoint of water resistance and curability of the coating film.

The water-dispersible acrylic polymer particles (A) can have an average particle size within a range of 10-500 nm, preferably 20-300 nm, inter alia, 40-200 nm, from the viewpoint of dispersion stability of the particles and smoothness of resulting coating film.

In the present specification, the average particle size of the water-dispersible acrylic polymer particles (A) is a value measured with a submicron particle size distribution measuring device at 20° C., after diluting individual sample with deionized water according to the accepted practice. As the submicron particle size distribution measuring device, for example, COULTER N4 Model (tradename, Beckman Coulter, Inc.) can be used.

From the viewpoint of storage stability or performance of resulting coating film such as chipping resistance and water resistance, the water-dispersible acrylic polymer particles (A) can have a weight-average molecular weight of at least 1,100,000, in particular, within a range of 1,100,000-10,000,000, preferably 1,200,000-5,000,000, inter alia, 1,300,000-4,000,000.

The weight-average molecular weight of water-dispersible acrylic polymer particles can be measured by static light-scattering method. Specifically, it can be determined by using a multi-angle light-scattering detector and making Zimm plot(s) or the like or, according to SEC-MALLS method in which size-exclusion chromatograph is connected to a multi-angle light-scattering detector, drawing Debye plot.

In the present specification, the weight-average molecular weight of the water-dispersible acrylic polymer particles is a value obtained by measuring the weight-average molecular weight according to above SEC-MALLS method.

Generally in molecular weight measurements by light-scattering method, the following fundamental equation of light-scattering is used:

$$Kc/R(\theta) = 1/M_w P(\theta) + 2A_{2c} + \ldots \quad (1)$$

$R(\theta)$=reducing strength of scattered light (Rayleigh coefficient) at angle $\theta$
c=sample concentration
Mw=weight-average molecular weight
$A_2$=second virial coefficient
K=optical parameter
$P(\theta)$=angular scattering function.

Whereas, the weight-average molecular weight in the present specification is a value calculated from the equation (1) in which the second and subsequent terms which are the products of second virial coefficient multiplied by the sample concentration are ignored, similar to the SEC-MALLS method in which size-exclusion chromatograph is connected to a multi-angle light-scattering detector.

Inclusive of the measurements in the later-appearing Production Examples, in the present specification DAWN DSP Laser Photometer (Wyatt Technology Co.) was used as the detector, and as the columns three columns in total of two KF-806L and one KF-802 (tradename, Shodex Co.) were used, and the measurement was conducted under the conditions of: the solvent, tetrahydrofuran; measuring temperature, 40° C.; flow rate, 1 cc/min.; and sample concentration, 0.1 mass %.

The samples were prepared by drying emulsions of the water-dispersible acrylic polymer particles (A) at ambient temperature, preparing their 2.5 mass % tetrahydrofuran solutions and dissolving them at room temperature for 2 hours. At the time of measurement, each sample was further diluted to 0.1 mass % with tetrahydrofuran, filtered with a membrane filter of 1 μm in pore size, and used as the specimen to be measured.

The absorbance of the water-dispersible acrylic polymer particles (A) in the state of liquid dispersion in 1,4-dioxane solvent was measured as follows. An emulsion of the water-dispersible acrylic polymer particles (A) was dried at ambient temperature and formed into a solution or dispersion in 1,4-dioxane solvent at a mass concentration of 1.35% to be used as the sample. Its absorbance was measured with a spectrophotometer under the condition of 330 nm in wavelength, and the measured value was divided by the cell length (unit: cm) to obtain the absorbance per cm. As the spectrophotometer, U-4100 (tradename, HITACHI Ltd.) was used.

From the viewpoint of finished appearance of resulting coating film, the water-dispersible acrylic polymer particles (A) have the absorbance value not higher than 0.2, preferably not higher than 0.15, inter alia, not higher than 0.1, as measured in the state of liquid dispersion in 1,4-dioxane solvent at a concentration of 1.35 mass % with the spectrophotometer at a wavelength of 330 nm.

The water-dispersible acrylic polymer particles (A) having such an absorbance value can be obtained by, for example, emulsion polymerizing the above-described polymerizable unsaturated monomers in the presence of a dispersion stabilizer, at temperatures not higher than 80° C., preferably at 60-80° C., using azo compound, preferably difficultly water-soluble azo compound, as the radical polymerization initiator.

The water-dispersible acrylic polymer particles (A) are preferably neutralized with basic compound. As the neutralizer for the water-dispersible acrylic polymer particles (A), ammonia or water-soluble amino compound, for example, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be conveniently used.

Reactive Group-containing Resin (B)

The reactive group-containing resin (B) used in the present paint is subject to no particular limitation so long as it is a resin containing reactive groups. Examples of the resin species include acrylic resin, polyester resin, urethane-modified polyester resin and epoxy resin.

The reactive groups are functional groups having reactivity capable of crosslinking with those functional groups in the water-dispersible acrylic polymer particles (A), specific examples of which include acid group (e.g., carboxyl group, sulfonic acid group and the like), carbonyl group, N-methylolalkyl ether group, isocyanate group, epoxy group, amino group, alkoxysilyl group, carbodiimide group, hydrazide group and the like. Of these reactive functional groups, carboxyl group, carbonyl group and alkoxysilyl group are preferred.

As the reactive group-containing resin (B) in the present invention, acrylic resin and polyester resin containing these reactive groups can be conveniently used. Hereafter these resins are described in further details.

Reactive Group-containing Acrylic Resin

Acrylic resins which can be synthesized by (co)polymerization of polymerizable unsaturated monomer(s) represented by vinyl monomers by per se known methods and which are other than the water-dispersible acrylic polymer particles (A) are covered herein. The synthesis may be carried out either emulsion polymerization or solution polymerization, or the two methods may be concurrently used. Suspension polymerization method may also be used. Where solution polymerization is used for the synthesis, it is preferred to use, as the organic solvent for the reaction, hydrophilic organic solvent such as, for example, propylene glycol ether-type or dipropylene glycol ether-type. It is also preferred for the acrylic resin to have acid groups like carboxyl groups, from the viewpoint of water dispersibility.

In case the resins are synthesized by emulsion polymerization, they can be easily obtained, for example, by emulsion polymerizing polymerizable unsaturated monomers using polymerization initiator, in the presence of one, two or more emulsifiers. As the emulsifier, for example, nonionic surfactant, anionic surfactant and reactive surfactant having copolymerizable unsaturated group can be named.

As the polymerizable unsaturated monomers, those known per se can be used, for example, reactive group-containing polymerizable unsaturated monomer and other polymerizable unsaturated monomer can be used.

Examples of reactive groups in above reactive group-containing polymerizable unsaturated monomers include functional groups having reactivity, such as acid group, carbonyl group, N-methylolalkyl, ether group, isocyanate group, epoxy group, amino group, alkoxysilyl group, carbodiimide group, hydrazide group and the like.

As acid group-containing polymerizable unsaturated monomer, carboxyl group- or acid anhydride group-containing polymerizable unsaturated monomers can be named.

As carboxyl group- or acid anhydride group-containing polymerizable unsaturated monomer, for example, unsaturated carboxylic acid such as acrylic acid, methacrylic acid, maleic acid, fumaric acid, crotonic acid, itaconic acid, β-carboxyethyl acrylate, or their acid anhydrides can be named.

As polymerizable unsaturated monomer containing acid group other than carboxyl group or acid anhydride group, for example, 2-acrylamido-2-methylpropanesulfonic acid, allylsulfonic acid, styrenesulfonic acid sodium salt, sulfoethyl methacrylate and sodium salt or ammonium salt thereof can be named.

As carbonyl group-containing polymerizable unsaturated monomer, for example, acrolein, diacetoneacrylamide, diacetonemethacrylamide, formyl styrol, and $C_{4-7}$ vinyl alkyl ketones such as vinyl methyl ketone, vinyl ethyl ketone, vinyl butyl ketone and the like can be named. Of these, diacetoneacrylamide and diacetonemethacrylamide are particularly preferred.

As N-methylolalkyl ether group-containing polymerizable unsaturated monomer, for example, N-methylolacrylamidobutyl ether can be named.

Isocyanate group-containing polymerizable unsaturated monomer is a compound containing at least one each of unblocked isocyanate group and radical-polymerizable double bond per molecule, examples of which include methacryloyl isocyanate, 2-isocyanate ethyl methacrylate, m- or p-isopropenyl-αα'-dimethylbenzyl isocyanate, or 1:1 (molar ratio) adducts of hydroxyl-containing polymerizable unsaturated monomer and diisocyanate compound (e.g., equimolar adduct of 2-hydroxyethyl acrylate and isophorone diisocyanate).

As epoxy group-containing polymerizable unsaturated monomer, for example, glycidyl acrylate, glycidyl methacrylate, CYCLOMER A-200 (alicyclic epoxy group-containing monomer), CYCLOMER M-100 (alicyclic epoxy group-containing monomer) and the like can be named.

As amino group-containing polymerizable unsaturated monomer, for example, dimethylaminoethyl acrylate, dimethylaminoethyl methacrylate, diethylaminoethyl acrylate, diethylaminoethyl methacrylate, dimethylaminopropylacrylamide, dimethylaminopropylmethacrylamide and the like can be named.

As alkoxysilyl group-containing polymerizable unsaturated monomer, for example, vinyltrimethoxysilane, vinyltriethoxysilane, vinyltributoxysilane, (meth)acryloyloxy-methyltrimethoxysilane, methyltrimethoxysilane, (meth)acryloyloxyethyltrimethoxysilane, γ-(meth)acryloyloxypropyltrimetheoxysilane, γ-(meth)acryloyloxypropyl-triethoxysilane, (meth)acryloyloxyethyltriethoxysilane, (meth)acryloyloxypropyltributoxysilane, vinyltris-β-methoxyethoxysilane, divinylmethoxysilane, divinyldi-β-methoxyethoxysilane and the like can be named.

In the present specification, "(meth)acryloyl" means acryloyl or methacryloyl.

As other polymerizable unsaturated monomer, for example, $C_{1-24}$ alkyl or cycloalkyl esters of (meth)acrylic acid such as methyl acrylate, ethyl acrylate, propyl acrylate, butyl acrylate, hexyl acrylate, cyclohexyl acrylate, 2-ethylhexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, cyclohexyl methacrylate, 2-ethylhexyl methacrylate, octyl methacrylate, lauryl methacrylate, stearyl methacrylate and the like; $C_{1-16}$ alkoxy alkyl esters such as methoxybutyl acrylate, methoxybutyl methacrylate, methoxyethyl acrylate, methoxyethyl methacrylate, ethoxybutyl acrylate, ethoxybutyl methacrylate and the like; aromatic unsaturated monomers such as styrene, vinyltoluene, α-methylstyrene, N-vinylpyrrolidone, vinylpyridine and the like; olefins such as ethylene, propylene, butylene, pentene and the like; diene compounds such as butadiene, isoprene, chloroprene and the like; dicyclopentenyl(meth)acrylate, dicyclopentenyloxyethyl(meth)acrylate, isobornyl(meth)acrylate, benzyl(meth)acrylate, N-butoxy(meth)acrylamide, adducts of glycidyl(meth)acrylate to amines and the like; vinyl propionate, vinyl acetate, vinyl pivalate, Veo Va monomers (products of Shell Chemicals Japan, Ltd.) and the like can be named.

When the reactive group-containing acrylic resin is synthesized by solution polymerization, it preferably has a weight-average molecular weight within a range of generally 1,000-200,000, in particular, 1,500-150,000, inter alia, 2,000-100,000, from the viewpoint of weatherability and finished appearance.

In the present specification, weight-average molecular weight of the resins other than the water-dispersible acrylic polymer particles (A) is the value calculated from the chromatogram measured with gel permeation chromatograph, by converting it based on the molecular weight of standard polystyrene. The gel permeation chromatograph was conducted using HLC8120GPC (tradename, Tosoh Corporation) and four columns of TSKgel G-4000HXL, TSKgel G-3000HXL, TSKgel G-2500-HXL and TSKgel G-2000HXL (tradename, Tosoh Corporation) under the conditions of: mobile phase, tetrahydrofuran; measuring temp., 40° C.; flow rate, 1 cc/min.; and detector, RI.

Thus obtained acrylic resin, where it is prepared by solution polymerization, preferably has an acid value within a range of generally 3-150 mgKOH/g, in particular, 4-100 mgKOH/g, inter alia, 5-70 mgKOH/g, from the viewpoint of dispersion stability in the water-based paint and curability and adherability of the coating film.

On the other hand, where it is synthesized by emulsion polymerization, the resulting acrylic resin preferably has from the viewpoint of water resistance of the coating film, an acid value within a range of generally 0.01-100 mgKOH/g, in particular, 0.05-90 mgKOH/g, inter alia, 0.1-75 mgKOH/g.

Where the acrylic resin contains acid groups and is dispersed in water, it is preferable to neutralize it with a neutralizer to improve water dispersibility by facilitating its mixing into water and dispersion therein.

Examples of neutralizer include hydroxides of alkali metals or alkaline earth metals, such as sodium hydroxide, potassium hydroxide, lithium hydroxide, calcium hydroxide and barium hydroxide; ammonia; primary monoamine compounds such as ethylamine, propylamine, butylamine, cyclohexylamine, monoethanolamine, isopropanolamine, neopentanolamine, 2-aminopropanol, 3-aminopropanol and 2-amino-2-methylpropanol; secondary monoamine compounds such as diethylamine, dibutylamine, diethanolamine, dipropylamine, diisopropanolamine, N-methylethanolamine, N-ethylethanolamine and N-methylisopropanolamine; tertiary monoamine compounds such as triethylamine, tributylamine, dimethylethanolamine, diethylethanolamine, methyldiethanolamine, dimethylaminoethanol and triethanolamine; and polyamine compounds such as ethylenediamine, diethylenetriamine, hydroxyethylaminoethylamine, ethylaminoethylamine and methylaminopropylamine. Of these, use of primary monoamine compound, secondary monoamine compound, tertiary monoamine compound or polyamine compound is preferred.

Reactive Group-containing Polyester Resin

The polyester resins are those synthesized through esterification reaction of polybasic acid with polyhydric alcohol according to the methods known per se. As the polyester resins, those having acid groups such as carboxyl groups as reactive groups are preferred, from the viewpoint of water dispersibility.

Polybasic acid is a compound having at least two carboxyl groups per molecule, examples of which include phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid and anhydrides of those acids.

Polyhydric alcohol is a compound having at least two hydroxyl groups per molecule, examples of which include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactonediols formed by adding lactones such as ε-caprolactone to these glycols; polyester diols such as bis(hydroxyethyl)-terephthalate and the like; 1,3-cyclohexanedimethanol, 1,4-cyclohexanedimethanol, tricyclodecanedimethanol, hydrogenated bisphenol A, hydrogenated bisphenol F, spiroglycol, dihydroxymethyltricyclodecane; glycerin, trimethylolpropane, trimethylolethane, diglycerin, triglycerin, 1,2,6-hexanetriol, pentaerythritol, dipentaerythritol, tripentaerythritol, sorbitol, mannitol; and hydroxycarboxylic acids such as 2,2-dimethylolpentanoic acid, 2,2-dimethylolbutanoic acid, 2,2-dimethylolpentanoic acid, 2,2-dimethylolhexanoic acid, 2,2-dimethylolpentanoic acid and the like.

As the polyester resin, fatty acid-modified polyester resins can also be used, which are modified with (semi)drying oil fatty acid such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid and the like. Generally preferred extent of modification with these fatty acids is not more than 30 wt % in terms of oil length. It is also permissible to use polyester resins which are partially reacted with monobasic acid such as benzoic acid.

The polyester resin may also be one formed by reaction of α-olefin epoxide such as propylene oxide or butylene oxide, or monoepoxy compound such as CARDURA E10 (tradename, Japan Epoxy Resin Co., Ltd., glycidyl ester of synthetic, highly branched saturated fatty acid), with acid groups in the polyester resin.

Introduction of carboxyl groups into the polyester resin can be done, for example, by adding acid anhydride to hydroxyl-containing polyester resin to cause half-esterification.

From the viewpoint of water resistance and adherability of the coating film, the polyester resin preferably has an acid value within a range of generally 5-100 mgKOH/g, in particular, 7.5-80 mgKOH/g, inter alia, 10-60 mgKOH/g.

Again from the viewpoint of water resistance and curability of the coating film, the polyester resin preferably has a weight-average molecular weight within a range of generally 1,000-200,000, in particular, 1,500-150,000, inter alia, 2,000-100,000.

Where the polyester resin contains acid groups and is dispersed in water, it is preferably neutralized with a neutralizer to facilitate its mixing and dispersing in water, from the viewpoint of improving water dispersibility.

As the neutralizer, those named as examples in relation to the acrylic resins can be similarly used.

Curing Agent (C)

The curing agent (C) optionally used in the paint compositions of the present invention is not particularly limited, so long as it is reactable with those reactive groups in the reactive group-containing resin (B).

Specifically as the curing agent (C), for example, polyisocyanate compound, polyhydrazide compound, polysemicarbazide compound, carbodiimide group-containing compound, oxazoline group-containing compound, epoxy compound, polycarboxylic acid and the like can be named. These curing agents can be used either alone or in combination of two or more.

The polyisocyanate compound is a compound having at least two isocyanate groups per molecule, specific examples include aliphatic polyisocyanate, alicyclic polyisocyanate, aromatic-aliphatic polyisocyanate, aromatic polyisocyanate and derivatives of these polyisocyanates.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate and the like; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanantomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, norbornane diisocyanate and the like; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatoproyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ωω'-diisocyanato-1,4-diethylbenzene, 1,3- or 1,4-bis(1-isocyanato-1-methylethyl)benzene (common name: tetramethylxylylene diisocyanate) or mixtures thereof, and aromoatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4"-triisocyanate, 1,3,5-triisocyanatobenzene, 2,4,6-triisocyanatotoluene and the like; and aromatic tetraisocyanates such as diphenylmethane-2,2',5,5'-tetraisocyanate and the like.

Also as the polyisocyanate derivatives, for example, their dimers, trimers, biurets, allophanates, carbodiimides, urethodiones, urethoimines, isocyanurates, oxadiazintrione, polymethylene polyphenyl polyisocyanate (crude MDI, polymeric MDI), crude TDI and the like can be named.

Blocked polyisocyanate compounds whose free isocyanate groups are blocked with a blocking agent can also be used as the polyisocyanate compound. The blocking agent dissociates from blocked polyisocyanate compound when the latter is heated to, for example, at least 100° C., preferably at least 130° C., to regenerate the isocyanate groups which can readily react with the reactive groups. Examples of the blocking agent include phenolic blocking agents such as phenol, cresol, xylenol, nitrophenol, ethylphenol, hydroxydiphenyl, butylphenol, isopropylphenol, nonylphenol, octylphenol, methyl hydroxybenzoate and the like; lactam blocking agents such as ε-caprolactam, δ-valerolactam, γ-butyrolactam, β-propiolactam and the like; aliphatic alcoholic blocking agents such as methanol, ethanol, propyl alcohol, butyl alcohol, amyl alcohol, lauryl alcohol and the like; ether blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcoholic blocking agents such as methylolurea, methylolmelamine, diacetone alcohol, 2-hydroxyethyl acrylate, 2-hydroxyethyl methacrylate and the like; oxime blocking agents such as formamidoxime, acetamidoxime, acetoxime, methyl ethyl ketoxime, diacetylmonooxime, benzophenoneoxime, cyclohexane-oxime and the like; active methylene blocking agents such as dimethyl malonate, diethyl malonate, ethyl acetoacetate, methyl acetoacetate, acetylacetone and the like; mercaptan blocking agents such as butyl mercaptan, t-butyl mercaptan, hexyl mercaptan, t-dodecyl mercaptan, 2-mercaptobenzothiazole, thiophenol, methylthiophenol, ethylthiophenol and the like; acid amide blocking agents such as acetanilide, acetanisidide, acetotoluide, acrylamide, methacrylamide, acetamide, stearamide, benzamide and the like; imides such as succinimide, phathalimide, maleimide and the like; amine blocking agents such as diphenylamine, phenylnaphthylamine, xylidine, N-phenylxylidine, carbazole, aniline, naphthylamine, butylamine, dibutylamine, butylphenylamine and the like; imidazole blocking agents such as imidazole, 2-ethylimidazole and the like; pyrazole blocking agents such as 3,5-dimethylpyrazole; urea blocking agents such as urea, thiourea, ethyleneurea, ethylenethiourea, diphenylurea and the like; carbamic acid ester blocking agents such as phenyl N-phenylcarbamate; imine blocking agents such as ethyleneimine, propyleneimine and the like; and sulfite blocking agents such as sodium disulfite, potassium disulfite and the like.

When polyisocyanate compound is used as the curing agent, for example, organotin compound may be used as the curing catalyst.

Polyisocyanate compound can be advantageously used as the crosslinking agent for the resin (B) which contains amino groups as the reactive group.

The polyhydrazide compound contains at least two hydrazide groups per molecule, examples of which include $C_{2-18}$ saturated aliphatic carboxylic acid dihydrazides such as oxalic dihydrazide, malonic dihydrazide, succinic dihydrazide, glutaric dihydrazide, adipic dihydrazide, sebacic dihydrazide and the like; dihydrazides of monoolefinic unsaturated dicarboxylic acid such as maleic dihydrazide, fumaric dihydrazide, itaconic dihydrazide and the like; polyhydrazides of carbonic acid such as carbonic dihydrazide; polyhydrazides of aromatic polycarboxylic acid such as dihydrazides of phthalic acid, terephthalic acid or isophthalic acid, dihydrazide, trihydrazide or tetrahydrazide of pyromellitic acid and the like; aliphatic trihydrazides such as nitrilotriacetic trihydrazide, citric trihydrazide, 1,2,4-benzenetrihydrazide and the like; tetrahydrazides such as ethylenediaminetetraacetic tetrahydrazide, 1,4,5,8-naphthoic 5 tetrahydrazide and the like; and polyhydrazides made by reaction of low molecular weight polymers having carboxylic acid lower alkyl ester groups with hydrazine or hydrazine hydrate (cf. JP Sho 52 (1977)-22878B) and the like.

Where above polyhydrazide compound shows too strong lo hydrophobicity, its dispersing in water becomes difficult, making it difficult to obtain uniformly crosslinked coating film. It is preferable, therefore, to use relatively low molecular weight (not higher than about 300) compounds having adequate hydrophilicity. As such polyhydrazide compounds, for example, dihydrazide compounds of $C_{4-12}$ dicarboxylic acids such as succinic dihydrazide, glutaric dihydrazide, adipic dihydrazide and sebacic dihydrazide can be named.

Polyhydrazide compounds can generally be advantageously used as crosslinking agent of the resin (B) having carbonyl groups as the reactive group.

Polysemicarbazide compound is a compound containing at least two semicarbazide groups per molecule, examples of which include aliphatic, alicyclic or aromatic bissemicarbazides; polyfunctional semicarbazides obtained through reaction of diisocyanates such as hexamethylene diisocyanate or isophorone diisocyanate, or polyisocyanate compounds derived therefrom, with excessive N,N-substituted hydrazines such as N,N-dimethylhydrazine or above-exemplified hydrazides; aqueous polyfunctional semicarbazides obtained through reaction of isocyanate groups in the reaction products from reacting the polyisocyanate compounds with polyether and hydrophilic group-containing active hydrogen compounds such as polyols or polyethylene glycol monoalkyl ethers, with excessive dihydrazides as named above (e.g., cf. JP Hei 8 (1996)-151358A); compounds having semicarbazide groups such as mixtures of the polyfunctional semicarbazides and the aqueous polyfunctional semicarbazides; hydrazone group-containing compounds such as bisacetyldihydrazone and the like.

Polysemicarbazide compounds can generally be advantageously used as crosslinking agent of the resin (B) having carbonyl groups as the reactive group.

Carbodiimide group-containing compounds are those obtained by, for example, mutual de-carbon dioxide reaction between isocyanate groups in polyisocyanate compounds. Examples of corresponding commercial products include CARBODILITE V-02, CARBODILITE V-02-L2, CARBODILITE V-04, CARBODILITE E-01 and CARBODILITE E-02 (tradenames, Nisshinbo Industries, Inc.).

Carbodiimide group-containing compounds can generally be advantageously used as the crosslinking agent for the resin (B) containing carboxyl groups as the reactive groups.

Oxazoline group-containing compound include, for example, oxazoline group-containing polymers, e.g., (co)polymers obtained by copolymerizing oxazoline group-containing polymerizable unsaturated monomers, where necessary, with other polymerizable unsaturated monomers by the methods heretofore known (e.g., solution polymerization, emulsion polymerization and the like). Examples of the oxazoline group-containing polymerizable unsaturated monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like. Also examples of the other polymerizable unsaturated monomer include $C_{1-24}$ alkyl or cycloalkyl esters of (meth)acrylic acid such as methyl (meth)acrylate, ethyl(meth)acrylate, propyl(meth)acrylate, butyl(meth)acrylate, 2-ethylhexyl(meth)acrylate, cyclohexyl (meth)acrylate, lauryl(meth)acrylate, isobornyl(meth)acrylate and the like; $C_{2-8}$ hydroxyalkyl esters of (meth)acrylic acid such as 2-hydroxyethyl(meth)acrylate, hydroxypropyl (meth)acrylate and the like; vinyl aromatic compounds such as styrene, vinyltoluene and the like; (meth)acrylamide, dimethylaminopropyl(meth)acrylamide, dimethylaminoethyl (meth)acrylate, adducts of glycidyl(meth)acrylate to amines; polyethylene glycol(meth)acrylate; N-vinylpyrrolidone, ethylene, butadiene, chloroprene, vinyl propionate, vinyl acetate, (meth)acrylonitrile and the like. These can be used either alone or two or more of them are suitably selected.

Oxazoline group-containing compounds can generally be advantageously used as the crosslinking agent for the resin (B) containing carboxyl groups as the reactive group.

Epoxy compound refers to compounds having at least two epoxy groups per molecule, of which specific examples include diepoxy compounds such as bis(3,4-epoxycyclohexylmethyl)adipate and the like, epoxy group-containing acrylic resin and the like.

Epoxy compound can generally be advantageously used as the crosslinking agent for the resin (B) containing acid groups or amino groups as the reactive group.

Examples of the polycarboxylic acid include aliphatic polybasic acids such as adipic acid, azelaic acid, sebacic acid, 1,4-cyclohexanedicarboxylic acid, 1,2-cyclohexanedicarboxylic acid, 1,2,4-butanetricarboxylic acid, 1,2,3,4-butanetetracarboxylic acid and the like; aromatic polybasic acids such as phthalic acid, isophthalic acid, terephthalic acid, trimellitic acid and the like; half-esters formed of addition reaction of polyol to 1,2-acid anhydride; addition reaction products of polyepoxide and at least two equivalent to the epoxy groups in the polyepoxide of 1,2-acid anhydride; carboxyl-containing acrylic polymers; acrylic polymers containing half-esterified acid anhydride groups; carboxyl-containing polyester polymers and the like.

Those polycarboxylic acids can generally be advantageously used as crosslinking agent for the resin (B) containing epoxy groups or carbodiimide groups as the reactive group.

Of above-described curing agents (C), polyhydrazide compound, polysemicarbazide compound and carbodiimide group-containing compound are particularly preferred.

Water-based Paint Composition

The water-based paint composition of the present invention can be prepared by formulating the above-described water-dispersible acrylic polymer particles (A), reactive group-containing resin (B) and optionally curing agent (C) into paint, by the method known per se.

Adequate blend ratios of the water-dispersible acrylic polymer particles (A), reactive group-containing resin (B) and curing agent (C) in the water-based paint composition of the present invention are; based on the total solid resin content of the components (A), (B) and (C), the water-dispersible acrylic polymer particles (A) is within a range of generally 1-80 mass %, preferably 3-70 mass %, inter alia, 5-60 mass %; the reactive group-containing resin (B) is within a range of generally 1-90 mass %, preferably 3-80 mass %, inter alia, 5-70 mass %; and the curing agent (C), within a range of generally 0-60 mass %, preferably 0-50 mass %, inter alia, 0-40 mass %; in terms of solid content (non-volatile component).

Where necessary, pigment may be blended in the water-based paint composition of the present invention. As the pigment, for example, coloring pigment such as titanium dioxide, zinc flower, Carbon Black, Phthalocyanine Blue, Prussian Blue, Cobalt Blue, azo pigment, phthalocyanine pigment, quinacridone pigment, isoindoline pigment, vat pigment and perylene pigment; extenders such as talc, clay, kaoline, baryta, barium sulfate, barium carbonate, calcium carbonate, silica and alumina white; and effect pigment such as aluminum powder, mica powder, titanium dioxide-coated mica powder and the like can be conveniently used. These pigments can be used either alone or in combination of two or more.

An adequate blend ratio of such pigment in total is, per 100 mass parts of the combined solid resin content of the water-dispersible acrylic polymer particles (A), reactive group-containing resin (B) and curing agent (C), within a range of generally 0-250 mass parts, in particular, 3-150 mass parts.

The water-based paint composition of the present invention can further be suitably blended with curing catalyst, dispersing agent, antisettling agent, organic solvent, defoaming agent, thickener, UV absorber, light stabilizer, surface regulating agent and the like, where necessary.

Because the water-based paint composition of the present invention gives coating film of excellent finished appearance such as coated surface smoothness and performance such as water resistance, it suits to be used, for example, for construction materials, buildings, automobiles (in particular, for resinous materials, protective films).

Application of the water-based paint composition of the present invention onto a coating object can be carried out by per se known means, for example, air spray coating, airless spray coating, rotary atomizing coating, curtain coat flow coating or the like. Where necessary, static electricity may be applied in these coating means. As the coating means, particularly rotary atomizing coating under electrostatic impression is preferred. The coating can be effected once or plural times, until the desired film thickness is obtained. Preferred film thickness of the water-based paint composition of the present invention is, in terms of cured coating film, normally within a range of 3-100 μm, in particular, 5-60 μm. The coating film can be cured by heating at room temperature—about 170° C., in particular, about 60—about 160° C., for 10-40 minutes. The heat-curing can be effected with per se known heating means, such as drying oven, e.g., hot air oven, electric oven, infrared ray induction furnace, and the like. Where necessary, preheating at temperatures of about 50—about 80° C. for around 3-10 minutes may be conducted preceding the heat-curing, for promoting volatilization of volatile component such as the solvent.

The coating object is subject to no particular limitation, preferred examples including sheet steel such as cold-rolled sheet steel, zinc-plated sheet steel, zinc alloy-plated sheet steel, stainless steel sheet and tin-plated sheet steel; metal substrates such as aluminum plate and aluminum alloy plate; various plastic materials; concrete surface, mortar surface, slate plate, roofing tile, PC plate, ALC plate, cement calcium silicate plate, pottery, tile, glass, wood, stone, and coated surfaces. They may also be bodies of various vehicles such as automobiles, two-wheeled vehicles and container cars, or construction materials, formed of such materials as above.

The coating objects may also be metallic surfaces of metal substrates or of car bodies, which have been given a surface treatment such as phosphate treatment, chromate treatment or complex oxide treatment.

These coating objects may also be advancedly applied with undercoating (e.g., cationic electrocoating) and may optionally be further applied with an intermediate coating.

Furthermore, a coating film may be formed in advance on the coating object, by applying onto the intermediate coat a coloring paint or the like as a top coat.

The water-based paint composition of the present invention can be applied, as mixed with additives or the like which are added in the occasion of use, where necessary and, diluted by addition of water and/or organic solvent, where necessary, to be adjusted to have an adequate viscosity. The adequate viscosity in that occasion differs depending on composition of the paint. Whereas, when the viscosity is adjusted with Ford cup viscometer No. 4, it is normally within a range of about 20—about 60 seconds, preferably about 25—about 50 seconds, at 20° C. The coating solid content of the present paint is normally within a range of about 5—about 65 mass %, preferably about 10—about 45 mass %.

EXAMPLES

Hereinafter the invention is explained more specifically, referring to working Examples and Comparative Examples, it being understood that the invention is not limited to the following Examples only. "Part" and "%" appearing hereafter are by mass, and thickness of coating film is always based on that of cured coating film.

Production of Water-dispersible Acrylic Polymer Particles (A)

Production Example 1

A reactor equipped with a thermometer, thermostat, stirrer, reflux condenser and a dropping device was charged with 85 parts of deionized water and 1.0 part of ADEKARIASOAP SR-1025[note 1] which were mixed by stirring in gaseous nitrogen current, and the temperature was raised to 75° C. Then 3% of the total amount of an emulsion[note 2] of the following monomers and the initiator and 10 parts of 0.5% aqueous ammonium persulfate solution were introduced into the reactor and maintained at 75° C. for 2 hours. Thereafter the remainder of the monomer-initiator emulsion was dropped into the reactor over 5 hours, and aged for 6 hours after completion of the dropping. Then the reaction mixture was cooled to 30° C. and adjusted to have a solid content of 40% and pH of 6.8, with 5.0% aqueous dimethylethanolamine solution and deionized water, followed by discharge under filtration with 200-mesh Nylon cloth, to provide a dispersion of water-dispersible acrylic polymer particles 1 (solid content 40 wt %) having an average particle size of 135 nm [measured as diluted with deionized water, at 20° C., with a sub-micron particle size distribution-measuring apparatus, COULTER N4 Model (tradename, Beckman Coulter, Inc.)] and an acid value of 13 mgKOH/g.

(Note 1) ADEKARIASOAP SR-1025: tradename, ADEKA Corporation, an ammonium salt of α-sulfo-ω-(1-(alkoxy)methyl-2-(2-propenyloxy)ethoxy)-poly(oxy-1,2-ethan-di-yl), active component, 25%

(Note 2) monomer-initiator emulsion: a monomer-initiator emulsion obtained by mixing and stirring 55 parts of deionized water, 2 parts of LATEMUL E-118B (tradename, KAO Corporation, sodium polyoxyethylene alkyl ether sulfate, active component 26%), 8 parts of ADEKARIASOAP ER-40[note 3] 10 parts of styrene, 30 parts of methyl methacrylate, 30 parts of n-butyl acrylate, 28 parts of ethyl acrylate and 2 parts of methacrylic acid; and 0.2 part of 2,2'-azobis[2-(2-imidazolin-2-yl)propane].

(Note 3) ADEKARIASOAP ER-40: tradename, ADEKA Corporation, a-hydro-ca-(1-(alkoxy)methyl-2-(2-propenyloxy)ethoxy)-poly(oxy-1,2-ethane-di-yl), active component, 60%.

Production Examples 2-3

Production Example 1 was repeated except that the composition of the monomer-initiator emulsion was changed as indicated in the following Table 1, to provide water-dispersible acrylic polymer particles 2-3.

The solid contents, acid values and hydroxyl values of thus obtained water-dispersible acrylic polymer particles 2-3 are shown in the following Table 1, concurrently with those of the product in Production Example 1.

TABLE 1

|  | Production Example | | |
|---|---|---|---|
|  | 1 | 2 | 3 |
| Water-dispersible acrylic polymer particles | 1 | 2 | 3 |
| Deionized water | | 85 | |
| ADEKARIASOAP SR-1025 (note 1) | | 1.0 | |
| 0.5% aqueous ammonium persulfate solution | | 10 | |

TABLE 1-continued

| | | Production Example | | |
|---|---|---|---|---|
| | | 1 | 2 | 3 |
| Monomeric emulsion | deionized water | | 55 | |
| | styrene | 10 | 10 | |
| | cyclohexyl methacrylate | | | 20 |
| | methyl methacrylate | 30 | 30 | 30 |
| | n-butyl acrylate | 30 | 30 | 30 |
| | ethyl acrylate | 28 | 23 | 19 |
| | 2-hydroxyethyl methacrylate | | 5 | |
| | methacrylic acid | 2 | 2 | 1 |
| | LATEMUL E-118B | 2 | 2 | 2 |
| | ADEKARIASOAP ER-40 (note 3) | 8 | 8 | 8 |
| 2,2'-Azobis[2-(2-imidazolin-2-yl)propane] | | 0.2 | 0.2 | 0.2 |
| Reaction temp. (° C.) | | | 75 | |
| Weight-average molecular weight (ten-thousands) | | 300 | 310 | 290 |
| Absorbance | | 0.05 | 0.05 | 0.05 |
| Average particle size (nm) | | 135 | 130 | 140 |
| Acid value (mgKOH/g) | | 13 | 13 | 6.5 |
| Hydroxyl value (mgKOH/g) | | | 21.6 | |
| Solid content (wt %) | | 40 | 40 | 40 |

Production of Reactive Group-containing Resin (B)

Production Example 4

A reactor equipped with a thermometer, thermostat, stirrer, reflux condenser and dropping device was charged with 36 parts of deionized water and 0.36 part of Newcol 707SF (tradename, Nippon Nyukazai Co., anionic surfactant, non-volatile component 30%), which were stirred in gaseous nitrogen current, mixed, and raised of the temperature to 82° C. Then 0.1 part of ammonium persulfate was added and 15 minutes after the addition, a pre-emulsion of the following composition was added dropwise over 3 hours.
<Composition of the Pre-emulsion>

Deionized water, 52 parts; diacetoneacrylamide, 5 parts; acrylic acid, 0.5 part; styrene, 10 parts; methyl methacrylate, 32.8 parts; ethyl acrylate, 27 parts; n-butyl acrylate, 24.7 parts; Newcol 707SF, 9.7 parts; and ammonium persulfate, 0.2 part.

Thirty (30) minutes after termination of the dropwise addition, an aqueous solution of 0.1 part of ammonium persulfate in 1.2 parts of deionized water was added dropwise over 30 minutes, followed by 2 hours' aging and further cooling to 40° C. Adjusting pH to 8.5 with aqueous ammonia, a dispersion of reactive group-containing resin (B-1) (solid content, 51.5%) was obtained.

Production Example 5

A reactor equipped with a thermometer, thermostat, stirrer, lo reflux condenser and dropping device was charged with 30 parts of deionized water and 0.1 part of Newcol 707SF, which were then stirred and mixed in gaseous nitrogen current and raised of the temperature to 85° C. Into the mixture 3 mass % of pre-emulsion (1) of the following composition and 25 mass % of the following aqueous ammonium persulfate solution were added and stirred.

Twenty (20) minutes after the addition, the remainder of the pre-emulsion (1) and 35 mass % of the same aqueous ammonium persulfate solution were added dropwise over 3 hours.
<Composition of Pre-emulsion (1)>

Deionized water, 27 parts; styrene, 9.8 parts; methyl methacrylate, 19.5 parts; n-butyl acrylate, 30.8 parts; 2-ethylhexyl acrylate, 9.8 parts; acrylic acid, 0.14 part; and Newcol 707SF, 4.62 parts.

<Aqueous Ammonium Persulfate Solution>

Ammonium persulfate, 0.5 part; and deionized water, 10 parts.

After termination of the dropping, the reaction mixture was allowed to stand at 85° C. for another hour, and then into which the following pre-emulsion (2) and 15 mass % of the same aqueous ammonium persulfate solution were added dropwise over an hour.
<Composition of Pre-emulsion (2)>

Deionized water, 11.5 parts; styrene, 4.2 parts; methyl methacrylate, 6.8 parts; n-butyl acrylate, 13.2 parts; 2-ethylhexyl acrylate, 4.2 parts; acrylic acid, 0.06 part; diacetoneacrylamide, 1.5 parts and Newcol 707SF, 2.0 parts.

After termination of the dropping, the reaction mixture was allowed to stand for further 2 hours at 85° C., and cooled to 40° C. Adjusting pH to 8.5 with aqueous ammonia, a dispersion of reactive group-containing resin (B-2) (solid content, 55%) was obtained.

Production Example 6

A reactor equipped with a thermometer, thermostat, stirrer, reflux condenser and dropping device was charged with 55 parts of deionized water and 0.15 part of sodium dodecylbenzenesulfonate, which were then stirred and mixed in gaseous nitroden current and raised of the temperature to 82° C. Then into the reactor pre-emulsion (3) of the following composition was added dropwise over 3 hours.
<Composition of Pre-emulsion (3)>

Deionized water, 40 parts; sodium dodecylbenzenesulfonate, 3 parts; ammonium persulfate, 0.15 part; cyclohexyl methacrylate, 20 parts; methyl methacrylate, 10 parts; n-butyl acrylate, 29.6 parts; n-butyl methacrylate, 9 parts; vinyltrimethoxysilane, 0.7 part and methacrylic acid, 0.7 part.

After termination of the dropwise addition of the pre-emulsion (3), another pre-emulsion (4) having the following composition was added dropwise over an hour, followed by 2 hours' aging at 82° C. and cooling to 40° C. Adjusting pH of the reaction mixture to 7.5 with aqueous ammonia, a dispersion of reactive group-containing resin (B-3) (solid content, 47.7%; average particle size, 130 nm) was obtained.
<Pre-emulsion 4 >

Deionized water, 18 parts; sodium dodecylbenzenesulfonate, 1.5 parts; ammonium persulfate, 0.05 part; cyclohexyl methacrylate, 15 parts; methyl methacrylate, 10 parts; n-butyl acrylate, 2 parts; n-butyl methacrylate, 2.4 parts; vinyl trimethoxysilane, 0.3 part; and methacrylic acid, 0.3 part.

Production Example 7

A reactor equipped with a thermometer, thermostat, stirrer, reflux condenser and a dropping device was charged with 33.5 parts of deionized water and 0.12 part of Newcol 707SF which were mixed and stirred in gaseous nitrogen current and the temperature therein was raised to 80° C. Then 0.05 part of ammonium persulfate was added, and 15 minutes thereafter, pre-emulsion (5) of the following composition was added dropwise over 140 minutes;
<Composition of Pre-emulsion (5)>

Deionized water, 27.9 parts; methyl methacrylate, 15.8 parts; n-butyl acrylate, 41.5 parts; acrylic acid, 0.2 part; Newcol 707SF, 6.5 parts and ammonium persulfate, 0.06 part.

After termination of the dropwise addition, the reaction system was kept at 80° C. for another hour, and into which the following pre-emulsion (6) was dropwisely added over 60 minutes.

<Composition of Pre-emulsion (6)>

Deionized water, 18.6 parts; methyl methacrylate, 27.5 parts; n-butyl acrylate, 12.8 parts; acrylic acid, 0.13 part; diacetoneacrylamide, 2.1 parts; Newcol 707SF, 2.8 parts and ammonium persulfate, 0.04 part.

After 30 minutes of termination of the dropwise addition, an aqueous solution of 0.1 part of ammonium persulfate in 1 part of deionized water was dropwisely added over 30 minutes, followed by 2 hours' aging and cooling to 40° C. Adjusting pH to 7.5 with aqueous ammonia, a dispersion of reactive group-containing resin (B-4) (solid content, 53.6%) was obtained.

Examples 1-2 (Peelable Water-based Paint Compositions) and Comparative Example 1

Into a stirrer 1286 parts of the dispersion of the reactive group-containing resin (B-1) (solid content, 51.5%) as obtained in Production Example 4 was thrown, and heated to 45° C., into which 29.9 parts of a solution of 4.9 parts of adipic dihydrazide in 25 parts of deionized water was added. Adjusting pH to 8.5 with aqueous ammonia, a crosslinkable resin dispersion (X) having a solid content of 50.7% was obtained.

Mixing by stirring the crosslinkable resin dispersion (X), water-dispersible acrylic polymer particles as obtained in Production Example 1 or 3, and the following peeling aid (Y) at the blend ratios (by solid content) indicated in Table 2, peelable water-based paint compositions 1-1 to 1-3 were obtained.

Peeling aid (Y): a peeling aid (Y) having a solid content of 30% was obtained by adding 2 parts of polyoxyethylenesorbitan monooleate and 68 parts of water to 30 parts of modified silicone TSF4445 (tradename, GE Toshiba Silicone Co., Ltd. polyether-modified silicone oil) and thoroughly stirring them.

To these compositions, polyoxyalkylenealkylphenyl ether, perfluoroalkylamine oxide and the like were added, where necessary, to adjust the former's viscosity and surface tension to the values given in Table 3. Then the compositions were spray coated onto coated plates which had been prepared by surface-treating mild steel sheets (0.7 mm in thickness) with PARBOND 3050 (tradename, Nippon Parkerizing Co., Ltd., zinc phosphate surface-treating agent), coating them with an aminoalkyd resin paint (Kansai Paint Co., tradename=AMILAC) and baking it at 140° C. for 30 minutes (glass transition point of the cured film=82° C.), and dried at 70° C. for 10 minutes to form 50-70 μm-thick peelable coating film. The results of performance tests of the films are collectively shown in Table 2. The tests and the evaluation methods were as follows.

TABLE 2

Paint Composition and Performance Test Result

|  | Example 1 | Example 2 | Comparative Example 1 |
|---|---|---|---|
| Water-based paint composition | 1-1 | 1-2 | 1-3 |
| Crosslinkable resin dispersion (X) | 80 | 80 | 100 |
| Water-dispersible acrylic polymer particles 1 | 20 | | |
| Water-dispersible acrylic polymer particles 3 | | 20 | |
| Peeling aid (Y) | 2 | 2 | 2 |
| Viscosity (Pa·s) | 0.9 | 0.8 | 0.7 |
| Surface tension (mN/m) | 30 | 31 | 34 |
| Peelability | ◯ | ◯ | ◯ |
| Accelerated weatherabilty | ◯ | ◯ | Δ |
| Protectivity (acid resistance) | ◯ | ◉ | Δ |
| Film strength (kgf/cm$^2$) | 200 | 190 | 160 |
| Film elongation (%) | 350 | 370 | 320 |

Viscosity: measured with Tokyo Keiki Kogyo Co., Ltd.'s B type Viscometer; measuring condition: coating liquid temperature, 20° C.; rotor rotation number, 60 rpm.

Surface tension: measured with Kyowa Chemical Co.'s Kyowa CBVP Surface Tensiometer.

Peelability: Standing a day at 20° C. after the film formation, the films of the peelable water-based paint compositions on the test panels were peeled from their edges at a rate of 1 m/30 sec. and ease of the peeling was tested:
  ◯: easily peelable
  Δ: peelable, though heavy
  X: peeling impossible.

Accelerated weatherability: After QUV accelerated exposure test using Q-Panel Co.'s accelerated weatherability tester for 960 hours (40 cycles), 1 cycle consisting of UV irradiation 16H/70° C. and water condensation 8H/50° C., the coating films were peeled off by the method similar to that used in above peelability test. Then the coated surface abnormality such as swelling in the aminoalkyd resin coating film which was the coated object was observed:
  ◯: no abnormality
  Δ: minor swelling observed
  X: serious swelling observed.

Protectivity (acid resistance): On each of the coated films 0.4 ml of 40% sulfuric acid was spotted, followed by heating at 70° C. for 15 minutes and washing with water. Then the films were peeled off and presence of swelling, fog and etching trace on the aminoalkyd coating film under the peeled film was observed:
  ◉: no abnormality observed
  ◯: slight fog recognized but no swelling or etching observed
  Δ: swelling observed
  X: fog and etching observed.

Strength and elongation of coating film: measured with Instron Tensile Tester (Shimadzu Corporation's Autograph) at 20° C. The pull speed was 50 mm/min. and the load was 5 kg.

Examples 3-5 (Elastic Base Water-based Paint Compositions) and Comparative Example 2

Elastic base water-based paint compositions 2-1 to 2-4 were obtained by blending the dispersion of the reactive group-containing resin (B-2) (solid content, 55%) as obtained in Production Example 5, water-dispersible acrylic polymer particles as obtained in Production Example 1 or 3, and the components (by solid content) as given in Table 3, and mixing them by stirring.

Each of the elastic base water-based paint compositions obtained as above was adjusted to have a viscosity adequate for coating with water, and applied onto a mortar plate with a sand aggregate roller (made of a porous material) at an application rate of about 1.0 kg/m$^2$, and dried for a day at 20° C. and 65% RH. Then on each of the base coating film a top paint

[a paint formed by blending and stirring together ALES RETAN (tradename, Kansai Paint Co., hydroxyl-containing acrylic type, isocyanate-curable solvent-based top paint) with, per 100 parts of solid resin content thereof, 20 parts of ES-48 (tradename, COLCOAT Co., Ltd., a low condensation product of ethyl silicate) and 5 parts of triethyl borate] was air spray coated at an application rate of about 0.2 kg/m² and dried for 7 days at 20° C. and 65% RH to provide coat-finished plates.

Composition of each of the elastic base water-based paint compositions and the results of performance tests given to the coat-finished plates are collectively shown in Table 3. The particulars of (*1)-(*5) in the Table 3 and of the tests and methods of evaluation were as follows.

TABLE 3

Paint Composition and Performance Test Results

|  | Example | | | Comparative Example |
|---|---|---|---|---|
|  | 3 | 4 | 5 | 2 |
| Elastic base water-based paint composition | 2-1 | 2-2 | 2-3 | 2-4 |
| Dispersion of reactive group-containing resin (B-2) | 160 | 160 | 160 | 200 |
| Dispersion of water-dispersible acrylic polymer particles 1 | 55 | 55 | | |
| Dispersion of water-dispersible acrylic polymer particles 3 | | | 55 | |
| Calcium carbonate | 363 | 363 | 363 | 363 |
| Hydroxyethyl cellulose (*1) | 25 | 25 | 25 | 25 |
| SN defoamer A63 (*2) | 5 | 5 | 5 | 5 |
| NOPCOSANT K (*3) | 3.1 | 3.1 | 3.1 | 3.1 |
| Film-forming aid (*4) | 11 | 11 | 11 | 11 |
| SWAZOL 310 (*5) | | 10 | 10 | 10 |
| Adipic dihydrazide | | 0.25 | 0.25 | 0.25 |
| Elongation (%) of the film of elastic base paint alone | 140 | 135 | 125 | 110 |
| Finished appearance | ◎ | ○ | ○ | ○ |
| Hot-Cold Repetition Test | ○ | ○ | ○ | Δ |

(*1) Hydroxyethyl cellulose: effective ingredient 2.5%, thickener
(*2) SN deformer A63: tradename, SAN NOPCO Ltd., deforming agent
(*3) NOPCOSANT K: tradename, SAN NOPCO Ltd., dispersant
(*4) Film-forming aid: 2,2,4-trimethyl-1,3-pentanediol monoisobutyrate
(*5) SWAZOL 310: tradename, COSMO OIL Co., Ltd., hydrocarbon solvent Elongation of the film of elastic base paint alone: The test specimens were prepared following JIS A 6909. Elongation of dried coating film of elastic base paint alone was measured with a tensile testing machine, Autograph AG 2000B Model (tradename, Shimadzu Corporation), in an atmosphere of 20° C., at a pull rate of 200 mm/min.

Finished appearance: Finished appearance of the coated film surface of each of the test-coated plates as obtained in the above was visually evaluated:
  ◎: finished uniformly and smoothly, free of unevenness, having very excellent coated film appearance
  ○: smoothness slightly less favorable but coated film appearance good
  X: uneven absorption of top paint observed.

Hot-Cold Repetition Test: The coat-finished plates, which were used for the finished appearance test, were dipped in 20° C. water for 18 hours, then immediately cooled in −20° C. thermostat for 3 hours, and heated in a 50° C. thermostat for 3 hours. That 24 hours being 1-cycle, 20-cycle test was given, and the coated surface condition after the test was visually evaluated:
  ○: no peeling, blistering or cracking recognizable, and no discoloration or gloss degradation occurred
  Δ: peeling, blistering or cracking not recognizable, but some discoloration or gloss degradation observed
  X: either of peeling, blistering or cracking observed.

Examples 6-8 (Water-based Paint Compositions) and Comparative

Example 4

Water-based paint compositions 3-1 to 3-4 each having a solid content of 54% were formulated by stirring and mixing the dispersion of the reactive group-containing resin (B-3) (solid content, 47.7%) as obtained in Production Example 6; water-dispersible acrylic polymer particles as obtained in Production Examples 1-3; silicone compound [methyltrimethoxysilane condensate (weight-average molecular weight, about 4,000)]; and pigment paste [a paste formed by mixing 2 parts of BYK-190 (tradename, BYK Chemie GmbH, a dispersing resin), 50 parts of deionized water and 100 parts of titanium white, and dispersing the mixture in a paint shaker (solid content, 67%)]; at the blend ratios as given in the following Table 4 and adjusting pH of the blends to about 8-9 by addition of 0.1 part of ammonia. The blend ratios shown in Table 4 are indicated by respective solid contents. Thus obtained water-based paint compositions were subjected to the following performance tests, with the results as concurrently given in Table 4. The test and evaluation methods were as follows.

TABLE 4

Paint Compositions and Performance Test Results

|  | Example | | | Comparative Example |
|---|---|---|---|---|
|  | 6 | 7 | 8 | 3 |
| Elastic base water-based paint composition | 3-1 | 3-2 | 3-3 | 3-4 |
| Reactive group-containing resin (B-3) | 80 | 80 | 80 | 100 |
| Water-dispersible acrylic polymer particles 1 | 20 | | | |
| Water-dispersible acrylic polymer particles 2 | | 20 | | |
| Water-dispersible acrylic polymer particles 3 | | | 20 | |
| Pigment paste | 74 | 74 | 74 | 74 |
| Silicone compound | 1 | 1 | 1 | 1 |
| TEXANOL (solvent) | 10 | 10 | 10 | 10 |
| Weatherabiity (luster retention, %) | 87 | 85 | 93 | 81 |
| Acid resistance (μm) | 0.3 | 0.4 | 0.3 | 0.5 |
| Water resistance | ◎ | ◎ | ◎ | ○ |

Weatherability: Onto sealer-coated slate plates, those water-based paint compositions as obtained in the Examples and Comparative Examples were applied to a dry film thickness of 30 μm and dried at 120° C. for 20 minutes to provide test plates. Their initial 60° specular luster values were measured.

Successively, the plates' accelerated weatherability test using Sunshine Weather-O-Meter (tradename, The Optronics Co., Ltd.) (rain cycle, 12 min./hr; black panel temp., 60-66° C.) was conducted. After 5,000 hours of the test, the plates' 600 specular luster values were measured as the final luster values. Dividing the values by their respective initial luster values, luster retention (%) were determined. The higher the luster retention, the better the weatherability of the coating film.

Acid resistance: Onto the coating film on each test plate, 0.4 cc of 40% sulfuric acid was dropped. The plates were heated on a 60° C. hot plate for 15 minutes, and then washed with water. The etching depth (μm) at the spot at which the sulfuric acid was dropped was measured with surface roughness meter (SURFCOM 570A, tradename, Tokyo Seimitsu Co., Ltd., surface roughness shape measuring machine) under the condition of 0.8 mm cut-off (scanning speed, 0.3 mm/sec.; magnification, 5000×), to measure acid resistance. The less the etching depth, the better the acid resistance.

Water resistance: The test plates were left standing in a 20° C. thermostat for 24 hours, dipped in 80° C. warm water for 5 hours, and thereafter their temperature was gradually dropped from 80° C. to room temperature, while being kept in the dipped state. The surface condition of the test plates withdrawn from the water was evaluated according to the following standard:

⊚: no fog or opacity recognized, very good
○: minor fog recognized, good
X: fog visible and coating film turned opaque.

Example 9

Water-based paint 4-1 was obtained as follows: 55 parts by solid weight of an aqueous polypropylene/ethylene copolymer [an ethylene-propylene copolymer (ethylene content, 5%) formed with use of metallocene catalyst, which was modified by addition of 8 wt % to the copolymer of maleic acid (melting point, 80° C.; Mw, about 100,000; Mw/Mn, about 2.1; acid value, 35), neutralized with equivalent dimethylethanolamine, and further dispersed in water using 10 parts of an emulsifier per 100 parts of the polypropylene/ethylene copolymer], 20 parts by solid weight of UX 5210 (tradename, Sanyo Chemical Industries, Ltd., urethane dispersion), 10 parts by solid weight of EPOCROS WS-100 (tradename, Nippon Shokubai Co., Ltd., oxazoline group-containing acrylic resin; solid content 40%; oxazoline equivalent, 220), 15 parts by solid weight of the dispersion of water-dispersible acrylic polymer particles 1 as obtained in Production Example 1, and 120 parts of JR-806 (tradename, Tayca Corporation, titanium white) were blended according to the accepted practice, and diluted with deionized water to the solid content of 40%.

Comparative Example 4

Example 9 was repeated except that 67 parts of the aqueous polypropylene/ethylene copolymer and 13 parts of EPOCROS WS-100 were used and no dispersion of the water-dispersible acrylic polymer particles 1 was blended, to provide water-based paint 4-2.

Example 10

Fifty-five (55) parts by solid weight of the aqueous polypropylene/ethylene copolymer (same to that used in Example 9), 20 parts by solid weight of UX5210, 15 parts by solid weight of the dispersion of water-dispersible acrylic polymer particles 1 as prepared in Production Example 1, 10 parts by solid weight of CARBODILITE V-02 (tradename, Nisshinbo Industries, Inc., carbodiimide group-containing compound, solid content, 40%; carbodiimide equivalent, 590) and 120 parts of JR-806 were blended according to the accepted practice, and diluted with deionized water to solid content of 40% to provide water-based paint 4-3.

Comparative Example 5

Example 10 was repeated except that 67 parts of the aqueous polypropylene/ethylene copolymer and 13 parts of CARBODILITE V-02 were used and no dispersion of the water-dispersible acrylic polymer particles 1 was blended, to provide water-based paint 4-4.

Example 11

Thirty (30) parts by solid weight of an aqueous dispersion of modified polypropylene (note 4), 45 parts by solid weight of the dispersion of reactive group-containing resin (B-4) as prepared in Production Example 7, 15 parts by solid weight of the dispersion of water-dispersible acrylic polymer particles 1 as prepared in Production Example 1, 10 parts of semicarbazide curing agent (note 5) and 120 parts of JR-806 were blended according to the accepted practice, and diluted with deionized water to solid content of 40% to provide water-based paint 4-5.

(note 4) Aqueous dispersion of modified polypropylene: In a 4-necked flask equipped with a stirrer, condenser tube, thermometer and dropping funnel, 100 g of maleic anhydride-grafted polypropylene (polypropylene prepared with use of metallocene catalyst, which was modified by addition of 4 wt % to the polypropylene of maleic acid: melting point, 80° C.; Mw, about 150,000; Mw/Mn, about 2.5) was heat-melted at 140° C., to which 15 g of polyoxyethylene stearyl ether (Newcol 11820, tradename, Nippon Nyukazai Co., Ltd., an end hydroxyl group-containing polyoxyethylene compound) was added, and reacted at 140° C. for 4 hours under stirring. After the reaction, the reaction mixture was cooled to 90° C., added with deionized water and filtered to provide an aqueous dispersion of modified polypropylene having a solid content of 30%.

(note 5) Semicarbazide curing agent: A reactor equipped with a reflux condenser, thermometer and stirrer was charged with 250 g of 80% hydrazine hydrate and 250 g of methanol, and into which 2250 g of methanol and 500 g of isophorone diisocyanate were added dropwise over an hour at room temperature, while being mixed in a static mixer. The system was further stirred at room temperature for an hour, followed by addition of 400 g of dioxane and pressure reduction at temperatures not higher than 30° C., to remove methanol. When the reaction mixture was allowed to stand for a while, white powder precipitated, which was recovered by filtration and vacuum-dried at room temperature to provide the semicarbazide curing agent.

Comparative Example 6

Example 11 was repeated except that 57 parts by solid weight of the dispersion of the reactive group-containing resin (B-4) and 13 parts of the semicarbazide curing agent were used and no dispersion of the water-dispersible acrylic polymer particles 1 was blended, to provide water-based paint 4-6.

Those water-based paints 4-1 to 4-6 as obtained in Examples 9-11 and Comparative Examples 4-6 were subjected to the following performance tests, with the results as shown in Table 5. The methods of preparing the coated test specimens, testing and evaluation were as follows.

Preparation of coated test specimens:

Molded bumpers of polypropylene (degreased) were spray-coated with each of the water-based paints serving as primer, to a dry film thickness of about 40 μm. The coated surfaces were preheated at 80° C. for 3 minutes, and onto which WBC #713T (tradename, Kansai Paint Co., water-based white mica base coat paint) serving as coloring base coat paint was applied to a dry film thickness of about 15 μm and preheated at 80° C. for 3 minutes. Then as clear paint Soflex #450 Clear (tradename, Kansai Paint Co., acrylic-urethane solvent-based clear paint) was electrostatically applied to a dry film thickness of about 30 μm, followed by heat-drying at 90° C. for 30 minutes. Thus the coated test specimens were prepared.

Water resistance: A part each of the coated bumpers serving as the coated test specimens was cut and dipped in 40° C. warm water for 20 days, withdrawn and dried. The appearance and adherability of the-coating films were evaluated as follows:

(Appearance) ○: no abnormality in coating film appearance

Δ: fogging occurred

X: blisters formed.

(Adherability) The coated surface of each test specimen was crosscut with a cutter to the depth reaching the substrate, to form one-hundred 2 mm×2 mm squares. Then an adhesive cellophane tape was stuck thereon, and rapidly peeled off at 20° C. The remaining number of squares of the film was examined.

○: One-hundred squares (no peeling)

Δ: 95-99 squares

X: less than 95 squares.

TABLE 5

Performance Test Result

| Water-based paint | Example | | | Comparative Example | | |
|---|---|---|---|---|---|---|
| | 9<br>4-1 | 10<br>4-3 | 11<br>4-5 | 4<br>4-2 | 5<br>4-4 | 6<br>4-6 |
| Water resistance (appearance) | ○ | ○ | ○ | Δ | Δ | Δ |
| Water resistance (adherability) | ○ | ○ | ○ | Δ | Δ | Δ |

The invention claimed is:

1. A water-based paint composition consisting essentially of water-dispersible acrylic polymer particles (A), a reactive group-containing acrylic resin (B) and optionally a curing agent (C), wherein the water-dispersible acrylic polymer particles (A) have a weight-average molecular weight of at least 1,100,000 and an absorbance in a liquid dispersion at a mass concentration of 1.35% in 1,4-dioxane solvent of not higher than 0.2 at a wavelength of 330 nm as measured with a spectrophotometer, and the water-dispersible acrylic polymer particles (A) are obtained by emulsion polymerization of polymerizable unsaturated monomers with an azo compound as a radical polymerization initiator, and wherein the reactive group-containing acrylic resin (B) has a weight-average molecular weight of 1,000-200,000.

2. The water-based paint composition according to claim 1, wherein the water-dispersible acrylic polymer particles (A) have a weight-average molecular weight of 1,100,000-10,000,000.

3. The water-based paint composition according to claim 1, wherein the water-dispersible acrylic polymer particles (A) are obtained by copolymerizing a mixture of polymerizable unsaturated monomers comprising 0.1-25 mass % of methacrylic acid, based on the total amount of the polymerizable unsaturated monomers.

4. The water-based paint composition according to claim 1, wherein the water-dispersible acrylic polymer particles (A) are obtained by copolymerizing a mixture of polymerizable unsaturated monomers comprising 0.1-40 mass % of hydroxyl group-containing methacrylate monomer(s), based on the total amount of the polymerizable unsaturated monomers.

5. The water-based paint composition according to claim 1, wherein the water-dispersible acrylic polymer particles (A) are obtained by copolymerizing a mixture of polymerizable unsaturated monomers comprising a combined 20-80 mass % of acrylate monomer(s) and styrene, based on the total amount of the polymerizable unsaturated monomers.

6. The water-based paint composition according to claim 1, wherein the water-dispersible acrylic polymer particles (A) are obtained by copolymerizing polymerizable unsaturated monomers in the presence of a reactive emulsifier having a polyoxyethylene group represented by the formula, —(CH$_2$CH$_2$O)$_n$—, wherein n is an integer of 5 to 60, and polymerizable unsaturated group(s) per molecule.

7. The water-based paint composition according to claim 1, wherein the water-dispersible acrylic polymer particles (A) have an acid value within a range of 0.1-100 mgKOH/g and a hydroxyl value within a range of 0-150 mgKOH/g.

8. A-The water-based paint composition according to claim 1, wherein the water-dispersible acrylic polymer particles (A) have an average particle size within a range of 10-500 nm.

9. A-The water-based paint composition according to claim 1, wherein the water-dispersible acrylic polymer particles (A) have an absorbance not higher than 0.15.

10. The water-based paint composition according to claim 1, wherein the reactive group-containing acrylic resin (B) has at least one reactive group selected from the group consisting of a carboxyl group, a carbonyl group and an alkoxysilyl group.

11. The water-based paint composition according to claim 1, wherein the curing agent (C) is selected from the group consisting of a polyisocyanate compound, a polyhydrazide compound, a polysemicarbazide compound, a carbodiimide group-containing compound, an oxazoline group-containing compound, an epoxy compound and a polycarboxylic acid.

12. The water-based paint composition according to claim 1 which comprises 1-80 mass % of the water-dispersible acrylic polymer particles (A), 1-90 mass % of the reactive group-containing acrylic resin (B), and 0-60 mass % of the curing agent (C), based on the total solid resin content of the water-dispersible acrylic polymer particles (A), reactive group-containing acrylic resin (B) and curing agent (C).

13. An article coated with the water-based paint composition as described in any one of claims 1-10, 11 and 12.

14. The water-based paint composition according to claim 1, wherein the water-dispersible acrylic polymer particles (A) are obtained by the emulsion polymerization of polymerizable unsaturated monomers with an azo compound as a radical polymerization initiator in the presence of a dispersion stabilizer, at a temperature of not higher than 80° C., wherein the azo compound has solubility in 25° C. water of not higher than 3 mass %.

* * * * *